United States Patent [19]

Yannopoulos et al.

[11] 4,392,991
[45] Jul. 12, 1983

[54] METHOD OF MAKING α-HEMATITE CATALYST

[75] Inventors: Lymperios N. Yannopoulos, Churchill; Joseph F. Pierre, West Deer, both of Pa.

[73] Assignee: Westinghouse Electric Corp., Pittsburgh, Pa.

[21] Appl. No.: 303,807

[22] Filed: Sep. 21, 1981

[51] Int. Cl.³ .......................... B01J 21/04; B01J 23/74
[52] U.S. Cl. .................................. 252/466 J; 252/472
[58] Field of Search ........................... 252/466 J, 472; 423/539, 633

[56] References Cited

U.S. PATENT DOCUMENTS

| | | | |
|---|---|---|---|
| 2,723,904 | 11/1955 | Reeve | 423/633 |
| 3,428,575 | 2/1969 | Pijpers et al. | 252/464 |
| 3,888,750 | 6/1975 | Brecher et al. | 204/129 |
| 4,003,850 | 1/1977 | Callighan et al. | 252/455 R |

Primary Examiner—W. J. Shine
Attorney, Agent, or Firm—R. D. Fuerle

[57] ABSTRACT

Disclosed is a method of making an α-hematite catalyst comprising condensing a ferric halide gas such as ferric chloride onto an inert metal oxide support such as alumina in the presence of moisture. The ferric chloride gas could be formed by reacting in iron source such as hematite with hydrogen chloride gas. The catalyst formed is less subject to erosion and is useful in the reduction of sulfur trioxide to sulfur dioxide.

4 Claims, No Drawings

METHOD OF MAKING α-HEMATITE CATALYST

BACKGROUND OF THE INVENTION

The decomposition of water into hydrogen and oxygen is considered an ideal way to store energy. While this decomposition can be accomplished by the electrolysis of water, that process is not as efficient as alternative, more complicated processes. One very efficient process for decomposing water is a hybrid electrolytic-thermochemical process which consists of two reactions:

$$2H_2O + SO_2 \rightarrow H_2 + H_2SO_4 \quad (1)$$

and $$2H_2SO_4 \rightleftharpoons 2H_2O + 2SO_2 + O_2 \quad (2)$$

Since sulfuric acid is the product of sulfur trioxide plus water, the second reaction can be represented as:

$$2SO_3 \rightleftharpoons 2SO_2 + O_2$$

The first reaction is accomplished electrochemically and the second reaction takes place in a thermal reduction reactor.

In the second reaction the oxygen produced is recovered and the sulfur dioxide and unreacted sulfur trioxide are recycled. The achievement of a maximum possible conversion of $SO_2$ per pass through the thermal reduction reactor is required for good heat economy and reasonably low recycle mass rates. Experiments have shown, however, that the purely thermal conversion of $SO_3$ to $SO_2$ is slow and has a poor yield.

To overcome this poor yield, various catalysts have been used. The one that is economically acceptable and has been shown to sufficiently accelerate the rate of conversion of $SO_3$ to $SO_2$ is commercially available alumina ($Al_2O_3$) supported alpha hematite ($\alpha$-$Fe_2O_3$). However, erosion of the hematite from the surface of the alumina support material takes place in the commercial catalyst due to poor adherence of the hematite to the alumina. This physical degradation of the catalyst results in decreasing catalytic activity as a function of time. As a result, the amount of $SO_2$ produced decreases accordingly. Should the eroded hematite be transported sufficiently far downstream of the reaction zone, where the equilibrium of reaction $2SO_3 \rightleftharpoons 2SO_2 + O_2$ shifts to the left, $SO_2$ can be oxidized back to $SO_3$. Additionally, the lines of the decomposition reactor become clogged. But with the exception of this difficulty, an α-hematite alumina supported catalyst works very well in this reaction.

SUMMARY OF THE INVENTION

We have discovered a process for making an alumina supported α-hematite catalyst which will not erode in the reduction of sulfur trioxide into sulfur dioxide. In addition to avoiding erosion, the catalyst of this invention has equal or better activity than the prior commercial alumina supported α-hematite catalyst. This is a surprising result since the catalyst of this invention has a lower surface area than does the prior commercial catalyst, and activity is usually a function of surface area. The catalyst of this invention can be readily made by a process which may actually be cheaper than the process of preparing a prior commercial catalyst.

DESCRIPTION OF THE INVENTION

In the process of this invention α-hematite is deposited on an inert support through a process of chemical vapor deposition. Particularly useful as support materials are metal oxides which will not react with the hematite or with the chemicals to be catalyzed, such as titanium dioxide or zirconium dioxide. The preferred support material, however, is alumina, particularly α-alumina, which is a finer and more active form of alumina.

Chemical vapor deposition may be conducted either in a conventional process or in a pack process. In both processes, a ferric halide gas is formed by the reaction of a hydrogen halide with a source of iron such as hematite. While any hydrogen halide, such as hydrogen bromide or hydrogen iodide, could be used, hydrogen chloride is preferred as it is easier to work with. If another hydrogen halide gas is used, reaction temperatures must be adjusted accordingly. The ferric halide gas and water vapor are the reaction products at the higher temperatures; at the lower temperatures the reaction is reversed and α-$Fe_2O_3$ is produced by the water vapor hydrolysis of the ferric halide vapor. The overall reaction is:

$$\alpha\text{-}Fe_2O_3(s) + 6HCl(g) \rightleftharpoons 2FeCl_3(g) + 3H_2O(g)$$

In the conventional chemical vapor deposition process the source of iron is placed upstream to the support material and the hydrogen halide gas flows over the iron source forming the corresponding ferric halide gas. The ferric halide gas reacts with water vapor to deposit the hematite on the support material. This process may be performed by heating the iron source to about 950° to about 1100° C., if the iron source is hematite. At temperatures over 1100° C. the quartz vessels, which are preferred for this reaction, tend to devitrify, and at temperatures of less than 950° C., the direction of the reaction is reversed so that ferric chloride is not efficiently formed. The support material, if α-alumina is used, should be heated to about 750° to about 850° C. for the maximum deposition of the hematite on it. In the conventional chemical vapor deposition process it is preferred to use a carrier gas to obtain sufficient flow. Any inert gases such as nitrogen or argon may be used as a carrier gas.

In the pack chemical vapor deposition process the support material and the iron source are mixed together and exposed to the hydrogen halide gas. In the pack process the temperature of the mixture should be about 900° to about 1000° C. if the iron source is hematite and the support material is alumina as lower temperatures will not result in the formation of ferric chloride, and higher temperatures will not deposit hematite. A coating forms due to the small temperature differentials in the mixture; this results in the saturation of ferric chloride at higher temperatures and its subsequent condensation when it reaches an area of slightly lower temperature. Separation of unreacted iron source and uncoated support material from the coated support material can be accomplished mechanically by means of a sieve. Preferably no carrier gas is used with the pack chemical vapor deposition process. The pack process is preferred to the chemical vapor deposition as it is easier to operate.

The following examples further illustrate this invention.

EXAMPLE I

Alumina spheres sold by Katalco Corporation under the trade designation "KATALCO NO. 80-6280" in an amount of 4.7450 grams were mixed with 2.3982 grams of α-hematite powder to give a mixture containing 66.4% by weight alumina and 33.6% by weight α-hematite. The mixture was placed in the center of an alumina boat 10 centimeters long, placed inside a quartz tube 12½ centimeters long. The tube was filled with hydrogen chloride to a pressure of 300 millimeters of mercury and was heated at 994° C. for about 15 hours. The alumina spheres were then separated with a sieve. The weight increase of the alumina spheres was 19.3% by weight.

EXAMPLE II

Example I was repeated using 5.5429 grams of alumina spheres and 3.0138 grams α-hematite. The mixture was heated in hydrogen chloride at 300 millimeters of mercury at 993° C. (at the center of the boat) for about 15 hours. The weight percent increase of the alumina spheres was 16%.

EXAMPLE III

Example I was repeated using 13.0372 grams of alumina spheres mixed with 8.8141 grams of α-hematite powder. The mixture was placed in an alumina boat 10 centimeters long, placed in a 15 centimeter quartz tube having an inside diameter of 2.8 centimeters. The temperature of the boat at 2.5 centimeter intervals was 880°, 912°, 917°, 923°, and 912° C. The pressure of hydrogen chloride was 300 millimeters of mercury. At 16 hours the weight pickup of the alumina spheres was 23 weight percent.

EXAMPLE IV

Example I was repeated using 4.0240 grams of α-hematite powder and 6.3621 grams of alumina spheres. The pressure of hydrogen chloride was about 300 millimeters of mercury. The temperature along the 10 centimeter boat at 2.5 centimeter intervals was 926°, 946°, 955°, 950° and 935° C. The quartz tube was about 17 centimeters long. The sample was heated for about 14 hours. The weight increase of the alumina spheres was about 10 weight percent. In this experiment the α-hematite powder was placed on the bottom of the boat, alumina silicate felt was placed on top of the hematite, and the alumina spheres were placed on top of the alumina silicate felt. This experiment demonstrated that the deposition on the alumina spheres was through the vapor phase due to the temperature gradient as measured along the boat. The weight increase (10 wt.%) was lower than in the previous examples due to the separation of the alumina support material and the reactant α-hematite powder.

We claim:
1. A method of making an alpha hematite catalyst comprising
   (A) forming a mixture of ferric oxide and an inert metal oxide support;
   (B) placing said mixture in a reaction vessel;
   (C) heating said mixture to a temperature of 900° to 1,000° C.;
   (D) passing a hydrogen halide gas over said mixture, whereby said ferric oxide forms a ferric halide which reacts with water vapor to reform ferric oxide as alpha hematite in said mixture.
2. A method according to claim 1 wherein said ferric halide is ferric chloride.
3. A method according to claim 1 wherein said inert metal oxide support is alumina.
4. A method according to claim 3 wherein said alumina is in the form of porous spheres about ⅛ to about ⅜ inch in diameter.

* * * * *